United States Patent
Cho

(10) Patent No.: US 7,165,865 B2
(45) Date of Patent: Jan. 23, 2007

(54) FOLDING MOBILE PHONE AND DOUBLE-SIDED LIQUID CRYSTAL DISPLAY PANEL

(75) Inventor: Tsung-Chieh Cho, Kaohsiung (TW)

(73) Assignee: Arima Display Corporation, Taipei (TW)

(*) Notice: Subject to any disclaimer, the term of this patent is extended or adjusted under 35 U.S.C. 154(b) by 157 days.

(21) Appl. No.: 11/004,279

(22) Filed: Dec. 3, 2004

(65) Prior Publication Data
US 2006/0121961 A1    Jun. 8, 2006

(51) Int. Cl.
  *F21V 33/00* (2006.01)
  *G02F 1/00* (2006.01)
  *G02F 1/1335* (2006.01)

(52) U.S. Cl. .............. 362/253; 362/321; 362/561; 362/600; 362/612; 345/1.1; 345/12; 345/13; 349/61; 349/65

(58) Field of Classification Search .......... 362/321, 362/561, 600, 612; 345/1.1, 12, 13; 349/61, 349/65
See application file for complete search history.

(56) References Cited

U.S. PATENT DOCUMENTS

| 6,674,496 | B1* | 1/2004 | Wei ..................... 349/63 |
| 6,741,301 | B1* | 5/2004 | Tsuji .................... 349/58 |
| 6,981,791 | B1* | 1/2006 | Higashiyama ......... 362/600 |
| 7,001,059 | B1* | 2/2006 | Han et al. ............. 362/616 |
| 2003/0063456 | A1* | 4/2003 | Katahira ............... 362/27 |
| 2005/0093767 | A1* | 5/2005 | Lu et al. ............... 345/1.1 |
| 2005/0253773 | A1* | 11/2005 | Sekiguchi ............. 345/1.1 |

* cited by examiner

Primary Examiner—Sandra O'Shea
Assistant Examiner—Mary Zettl
(74) Attorney, Agent, or Firm—J.C. Patents

(57) ABSTRACT

A folding mobile phone comprising a main body, a display sheathing and a pivot is provided. The main body comprises a button panel, and the display sheathing pivots on the main body. The display sheathing has two corresponding surfaces. Moreover, the display sheathing comprises a liquid crystal module, a light source and a light-guiding bar. Two light-guiding plates are respectively disposed over the two surfaces of the liquid crystal module. Each of the two corresponding surfaces exposes a portion of the light-guiding plate. Furthermore, the light source is disposed at a side of the liquid crystal module, and the light-guiding bar is disposed between the light source and the liquid crystal module. The light-guiding bar is connected with the pivot to swing between the two light-guiding plates and guides the light from the light source to one of the two light-guiding plates.

15 Claims, 9 Drawing Sheets

FOLDING MOBILE PHONE AND DOUBLE-SIDED LIQUID CRYSTAL DISPLAY PANEL

BACKGROUND OF THE INVENTION

1. Field of the Invention

The present invention relates to a mobile phone, and more particularly to a folding mobile phone with a double-sided liquid crystal display panel.

2. Description of the Related Art

With ever-developing wireless telecommunication technology, mobile phones are one of the most widely used wireless communication products. Based on the fact that each person owns at least one mobile phone, it is evident that mobile phones have become an essential part of modern living.

Recently, folding mobile phones gradually dominate the market. As phone manufacturers keep present new models, folding mobile phones have developed to be not only slim, stylish, and also to have more functions. In addition to the basic communication function, folding mobile phones also have such functions as cord ring tones, games, mobile secretary, mobile internet, etc. With the trend of color displays, folding mobile phones with cameras have increased popularity. Some folding mobile phones further provide the mobile video function. In a word, phone manufacturers are striving to introduce fresh new mobile phones models to catch consumers' attention and lure them into purchase.

FIGS. 1A and 1B are schematic drawings showing an external structure of a conventional folding mobile phone. FIG. 2 is a schematic drawing showing an internal structure of a display sheathing of a conventional folding mobile phone. Referring to FIGS. 1A, 1B and 2, a conventional folding mobile phone 100 comprises a main body 110, a display sheathing 120 and a pivot 140. Wherein, the main body 110 comprises at least one button panel 112. The display sheathing 120 pivots on the main body 110. The display sheathing 120 comprises a first surface 122 and a second surface 124 corresponding thereto. The first surface is near the main body 110, and the second surface is away from the main body 110. The pivot 140 is connected between the main body 110 and the display sheathing 120. In addition, the display window 122a of the first surface 122 exposes a portion of the first liquid crystal module 126, and the display window 124a of the second surface 124 exposes a portion of the second liquid crystal module 128.

In the conventional folding mobile phone 100, the internal part of the display sheathing 120 comprises two light-guiding plates 132 and 134 between the first liquid crystal module 126 and the second liquid crystal module 128. Edges of the light-guiding plates 132 and 134 comprise light emitting diodes 132a and 134a, respectively. Light emitted from the light emitting diodes 132a and 134a are guided by the light-guiding plates 132 and 134 to serve as a light source for the first liquid crystal module 126 and the second liquid crystal module 128.

Accordingly, the display sheathing 120 of the conventional folding mobile phone 100 requires two liquid crystal display modules 126 and 128 such that the first and the second surfaces 122 and 124 of the display sheathing 120 can perform the display function. Still, though these two liquid crystal display modules 126 and 128 support the double-sided display function in the display sheathing 120, the manufacturing costs of the folding mobile phones are increased. Considering the manufacturing costs, manufacturers would usually make the second liquid crystal display modules 128 smaller than the first liquid crystal display modules 126, and also with lower resolution and color saturation. Without substantially increasing the manufacturing costs, the conventional folding mobile phones 100 cannot provide better quality. Moreover, the thickness of the display sheathing 120 cannot be reduced due to the disposition of two liquid crystal modules 126 and 128.

SUMMARY OF THE INVENTION

Accordingly, the present invention is directed to a folding mobile phone, wherein a liquid crystal module is disposed between two light-guiding plates, and a light-guiding bar swings between the two light-guiding plates such that the double-sided display function can be performed, and the manufacturing cost of the folding mobile phones can thus be reduced.

The present invention is also directed to a double-sided liquid crystal display panel, wherein a liquid crystal module is disposed between two light-guiding plates, and a light-guiding bar swings between the two light-guiding plates such that the double-sided display function can be performed.

According to the descriptions above and other objects, the present invention provides a folding mobile phone, which comprises a main body, a display sheathing and a pivot. Wherein, the body comprises at least one button panel. The display sheathing pivots on the main body through the pivot. The display sheathing comprises a first surface and a second surface corresponding thereto. The first surface is near the main body, and the second surface is away from the main body. In addition, the display sheathing comprises a liquid crystal module, a light source and a light-guiding bar. Wherein, a first light-guiding plate and a second light-guiding plate corresponding thereto are disposed on two surfaces of the liquid crystal module. The first surface exposes a portion of the first light-guiding plate, and the second surface exposes a portion of the second light-guiding plate. The light source is disposed at a side of the liquid crystal module. The light-guiding bar is disposed between the light source and the liquid crystal module and is connected to the pivot. The light-guiding bar swings between the first light-guiding plate and the second light-guiding plate to guide light from the light source to either the first light-guiding plate or the second light-guiding plate.

In the folding mobile phone described above, when the display sheathing is opened, the light-guiding bar swings to the second light-guiding plate, for example. When the display sheathing is closed, the light-guiding bar, for example, swings to the first light-guiding plate. In addition, the light source can be, for example, a light emitting diode.

In the folding mobile phone described above, the light-guiding bar moves with the display sheathing through a spring-plate module. Wherein, the pivot comprises, for example, a fixed sleeve and a movable pivot. The fixed sleeve is connected with the main body. The movable pivot is connected with the display sheathing. The fixed sleeve has an protrusion part, for example. The spring-plate module comprises a first end, a second end and a rotation center. Wherein, the first end is connected with the light-guiding bar, the second end is adapted to contact with the protrusion part, and the rotation center is between the first end and the second end so that the light-guiding bar can swing between the first light-guiding plate and the second light-guiding plate. In addition, the protrusion part is located at a position parallel to a line passing through a center of the movable pivot with a 30° angle from the button panel.

In the folding mobile phone described above, the light-guiding bar moves with the display sheathing through a gear wheel device. Wherein, the pivot comprises a fixed sleeve and a movable pivot, for example. The fixed sleeve is connected with the main body. The movable pivot is connected with the display sheathing. The fixed sleeve comprises a saw-type protrusion portion. The light-guiding bar has an extension portion. An end of the extension portion has a gear wheel, which is adapted to contact with the saw-type extrusion portion, so that the light-guiding bar can swing between the first light-guiding plate and the second light-guiding plate. In addition, a center of the saw-type protrusion portion is located at a position parallel to a line passing through a center of the movable pivot with a 30° angle from the button panel.

In the folding mobile phone described above, the light-guiding bar moves with the display sheathing through a cam device, for example. Wherein, the pivot comprises, for example, a fixed sleeve and a movable pivot. The fixed sleeve is connected with the main body. The movable pivot is connected with the display sheathing. The fixed sleeve comprises a cam shape. The light-guiding bar has an extension portion. The end of the extension portion has a roller, which is adapted to contact with the cam shape, so that the light-guiding bar can swing between the first light-guiding plate and the second light-guiding plate. In addition, a longest distance from the cam device to the center of the movable pivot is when the cam device is located at a position parallel to a line passing through a center of the movable pivot with a 30° angle from the button panel.

The present invention also provides a double-sided liquid crystal display panel, which comprises a liquid crystal module, a light source and a light-guiding bar. Wherein, a first light-guiding plate and a second light-guiding plate corresponding thereto are disposed over two surfaces of the liquid crystal module. The light source is disposed at one side of the liquid crystal module, for example. The light-guiding bar is disposed between the light source and the liquid crystal module, for example, and can swing between the first light-guiding plate and the second light-guiding plate. The light-guiding bar guides light from the light source to either the first light-guiding plate or the second light-guiding plate.

In the double-sided liquid crystal display panel, the light source can be, for example, a light emitting diode or a cold cathode fluorescent tube.

The folding mobile phone of the present invention uses a double-sided liquid crystal display panel so that the two surfaces will alternatively display images when the display sheathing is opened or closed. Not only will the manufacturing costs be reduced, but the two surfaces of the display sheathing have the same dimension, resolution and color saturation. In the folding mobile phone of the present invention, the light-guiding bar moves with the display sheathing and swings between two light-guiding plates, and can therefore achieve the double-sided display function. Accordingly, the folding mobile phone of the present invention requires only one light source to perform the double-sided display function in the liquid crystal module. The manufacturing cost can thus be reduced.

The above and other features of the present invention will be better understood from the following detailed description of the embodiments of the invention that is provided in communication with the accompanying drawings.

DESCRIPTION OF SOME EMBODIMENTS

Figure 1A:
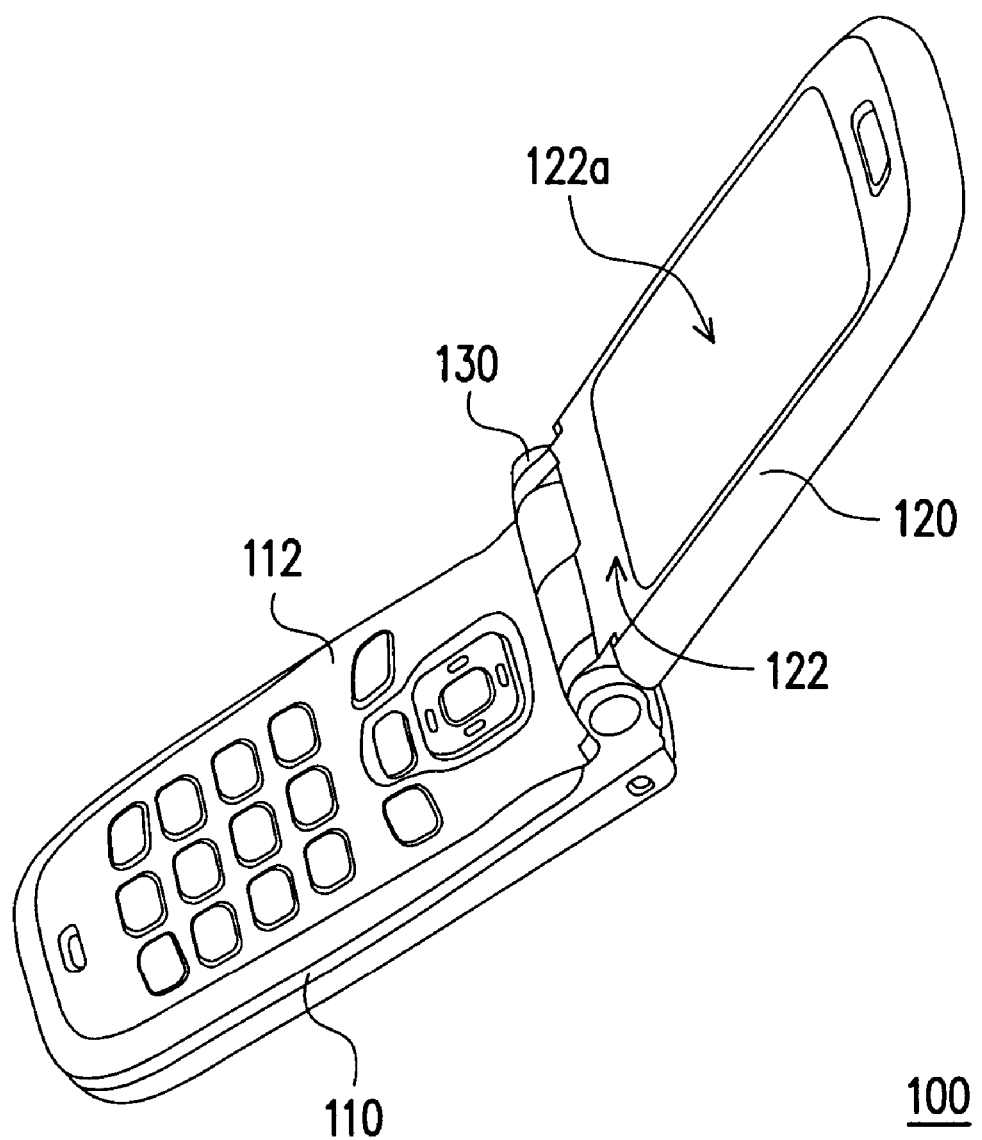
FIGS. 1A and 1B are schematic drawings showing an external structure of a conventional folding mobile phone.
Figure 1B:
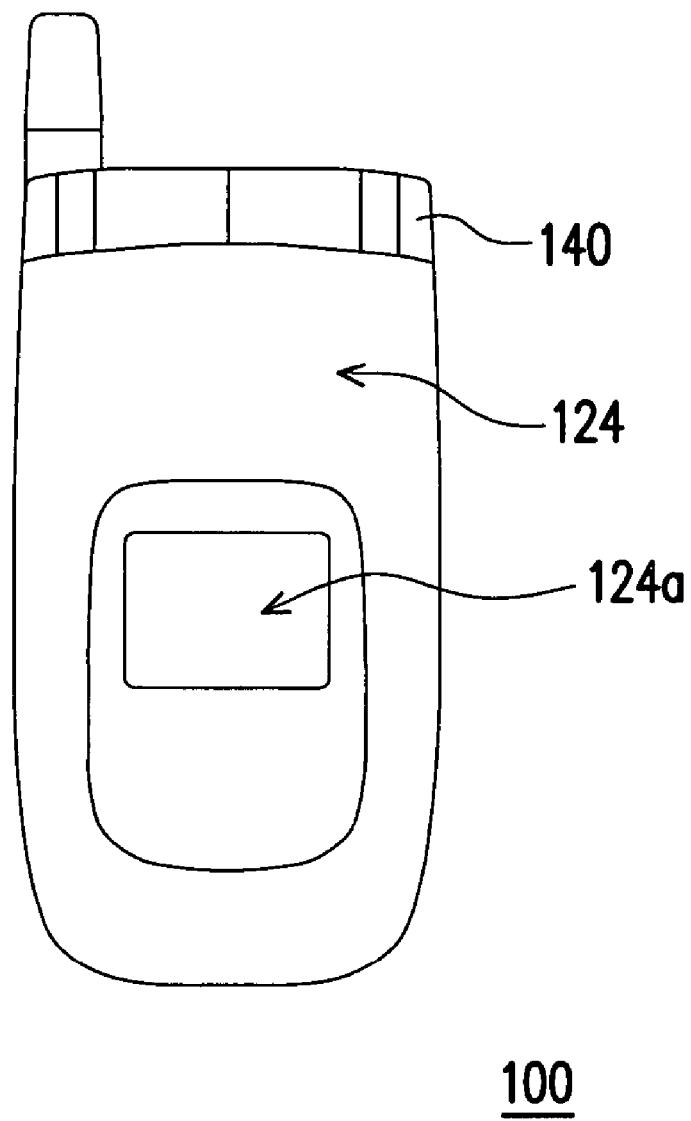
Figure 2:
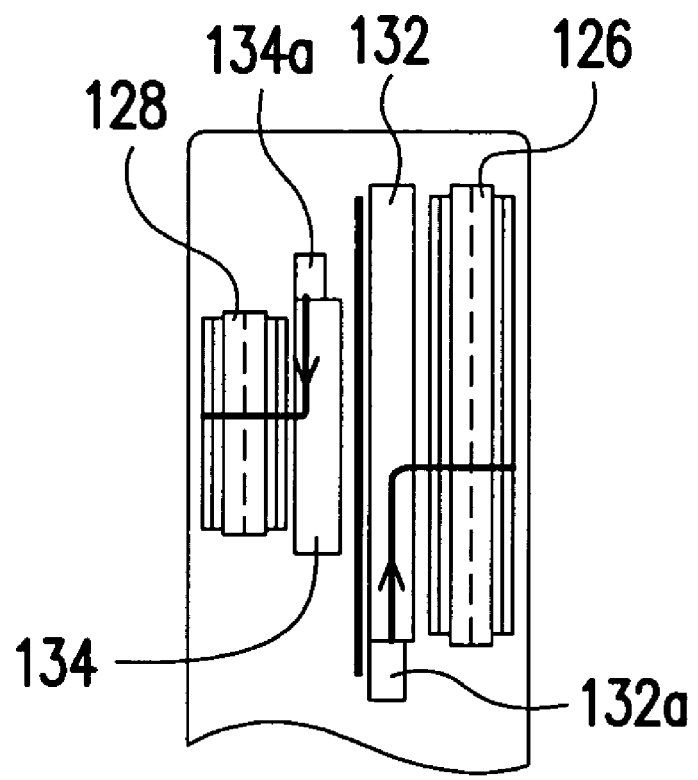
FIG. 2 is a schematic drawing showing an internal structure of a display sheathing in a conventional folding mobile phone.
Figure 3A:
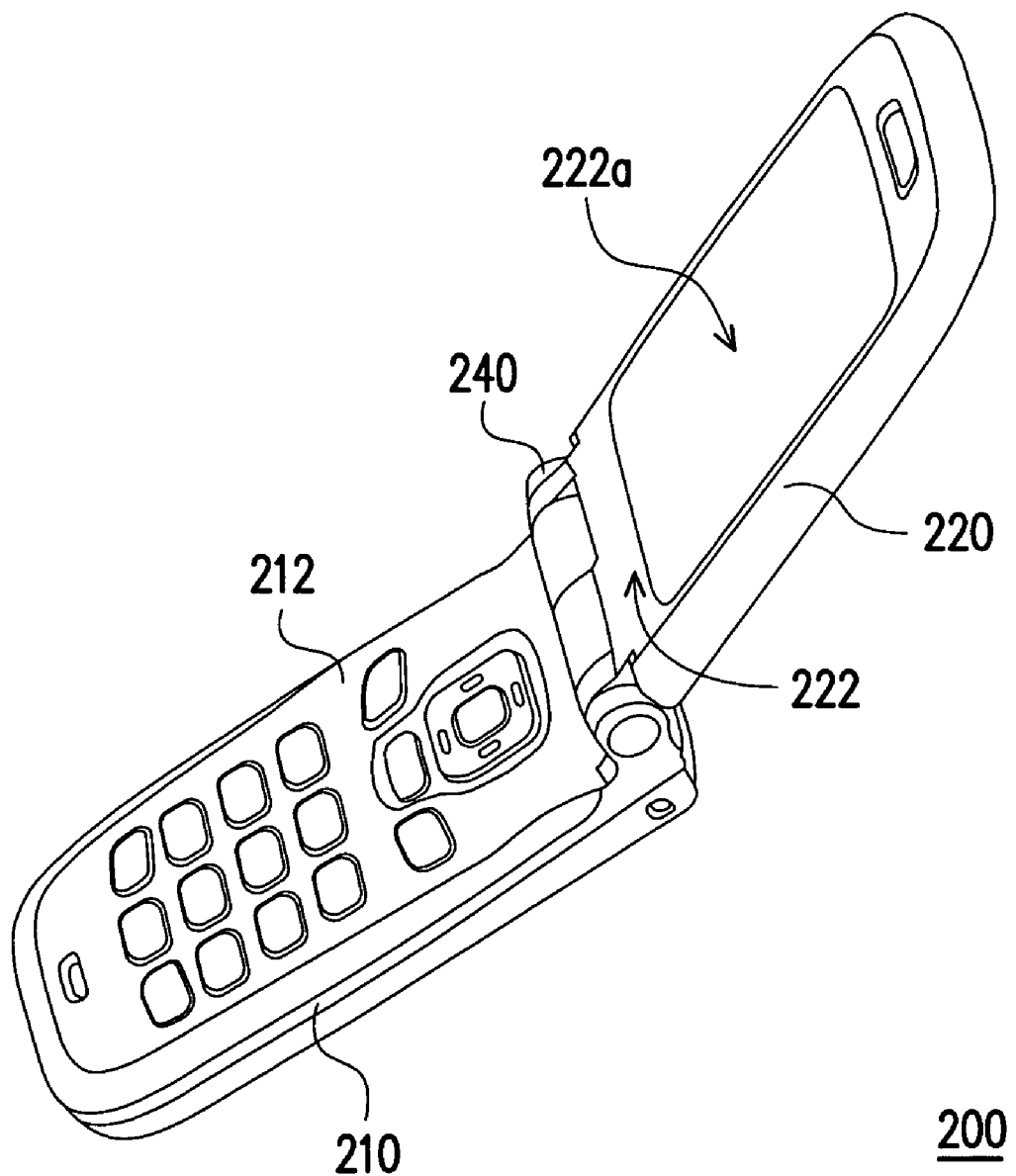
FIGS. 3A and 3B are schematic drawings showing a structure of a folding mobile according to an embodiment of the present invention.
Figure 3B:
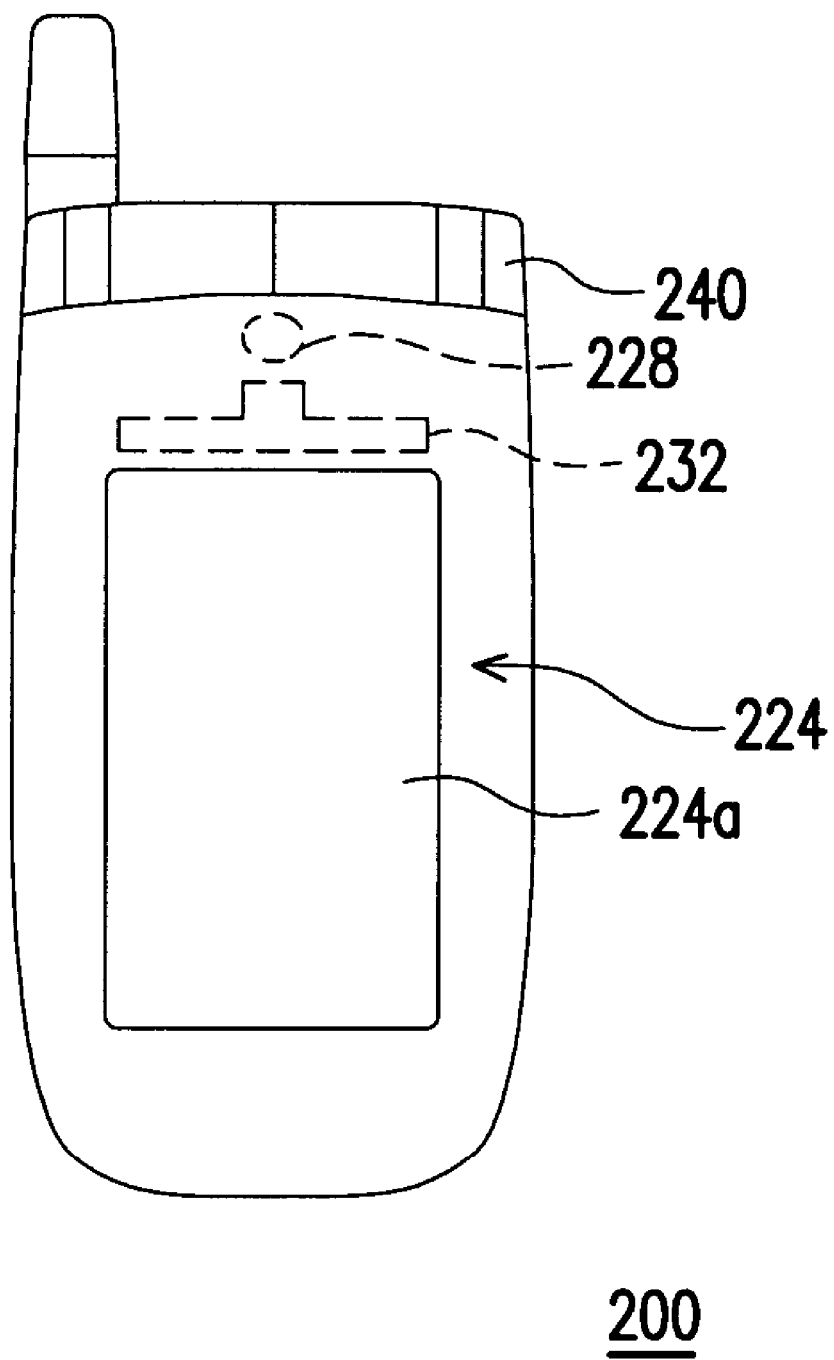
Figure 4:
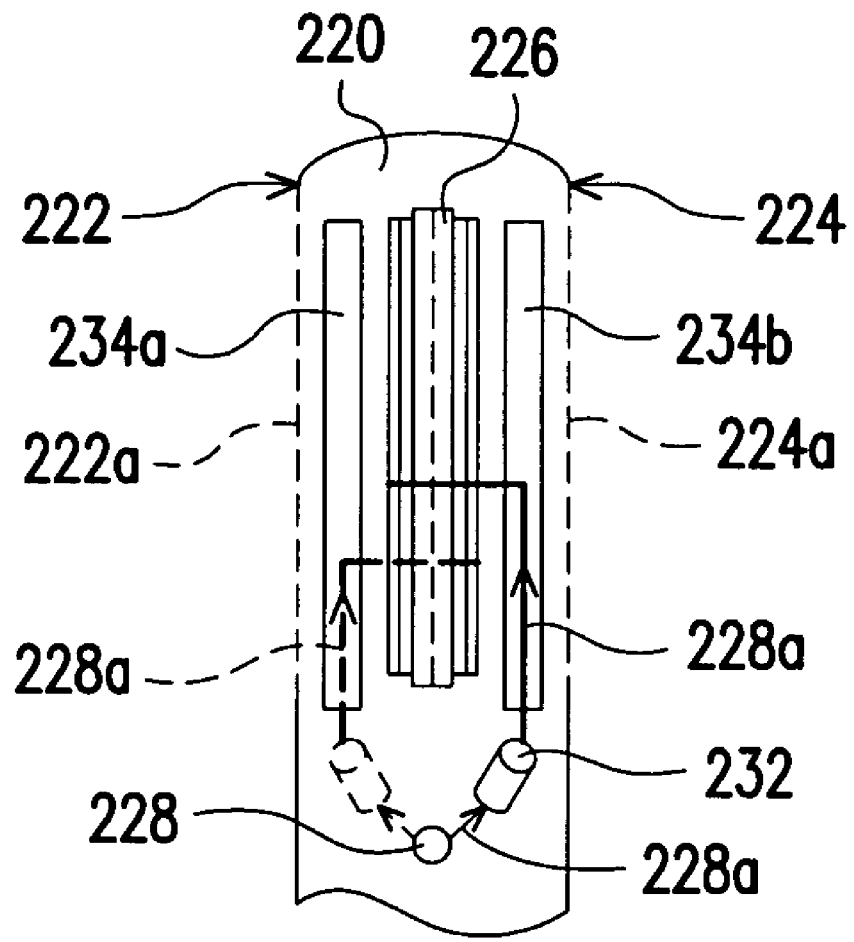
FIG. 4 is a schematic cross-sectional view of an internal structure of a display sheathing in a folding mobile phone according to an embodiment of the present invention.

FIGS. 3A and 3B are schematic drawings showing a structure of a folding mobile according to an embodiment of the present invention. FIG. 4 is a schematic cross-sectional view of an internal structure of a display sheathing in a folding mobile phone according to an embodiment of the present invention. Referring to FIGS. 3A, 3B and 4, the folding mobile phone 200 comprises a main body 210, a display sheathing 220 and a pivot 240. Wherein, the main body comprises a button panel 212, and the display sheathing 220 pivots on the main body 210 through the pivot 240. The display sheathing 220 comprises a first surface 222 and a second surface 224 corresponding thereto. The first surface 222 is near the main body 210, and the second surface 224 is away from the main body 210.

In the folding mobile phone 200, the internal part of the display sheathing 220 comprises a liquid crystal module 226, a light source 228 and a light-guiding bar 232. Wherein, a first light-guiding plate 234a and a second light-guiding plate 234b correspond thereto are disposed over two surfaces of the liquid crystal module 226, respectively. The first surface 222 exposes a portion of the first light-guiding plate 234a, and the second surface 224 exposes a portion of the second light-guiding plate 234b. In detail, the display window 222a of the first surface 222 exposes a portion of the first light-guiding plate 234a, and the display window 224a of the second surface 224 exposes a portion of the second light-guiding plate 234b.

In addition, the light source 228 can be, for example, a light emitting diode or a cold cathode fluorescent tube which is disposed at a side of the liquid crystal module 226. The light-guiding bar 232 is disposed between the light source 228 and the liquid crystal module 226. The pivot 240 is connected with the light-guiding bar 232 so that the light-guiding bar 232 can move with the display sheathing 220. When the display sheathing 220 is opened or closed, the light-guiding bar 232 swings to either the first light-guiding plate 234a or the second light-guiding plate 234b, and thus guides light from the light source 228 to either the first light-guiding plate 234a or the second light-guiding plate 234b. The detailed movement of the light-guiding bar with the display sheathing 220 is discussed in the following.

In an embodiment of the present invention, when the display sheathing 220 of the folding mobile phone 200 is opened as shown in FIG. 3A, the light-guiding bar swings to the second light-guiding plate 234*b*. The light-guiding bar 232 then guides light 228*a* to the second light-guiding plate 234*b*. The second light-guiding plate 234*b* guides the light 228*a* to the liquid crystal display module 226. The liquid crystal module 226 transforms the light 228*a* into images. Accordingly, when a user opens the display sheathing 220, the display window 228*a* shows these images.

In addition, when the display sheathing 220 is closed as shown in FIG. 3B, the light-guiding bar 232 swings to the first light-guiding plate 234*a*. The light-guiding bar 232 guides light 228*a* to the first light-guiding plate 234*a*. The first light-guiding plate 234*a* guides the light 228*a* to the liquid crystal display module 226. The liquid crystal module 226 transforms the light 228*a* into images. Accordingly, when a user closes the display sheathing 220, the display window 224*a* shows these images. Note that the liquid crystal display module 226 in the present embodiment displays different images when the display sheathing 220 is opened or closed to perform the dual-display function. Accordingly, the display windows 222*a* and 224*a* show images with same sizes and same resolution and color saturation.

Figure 5A:
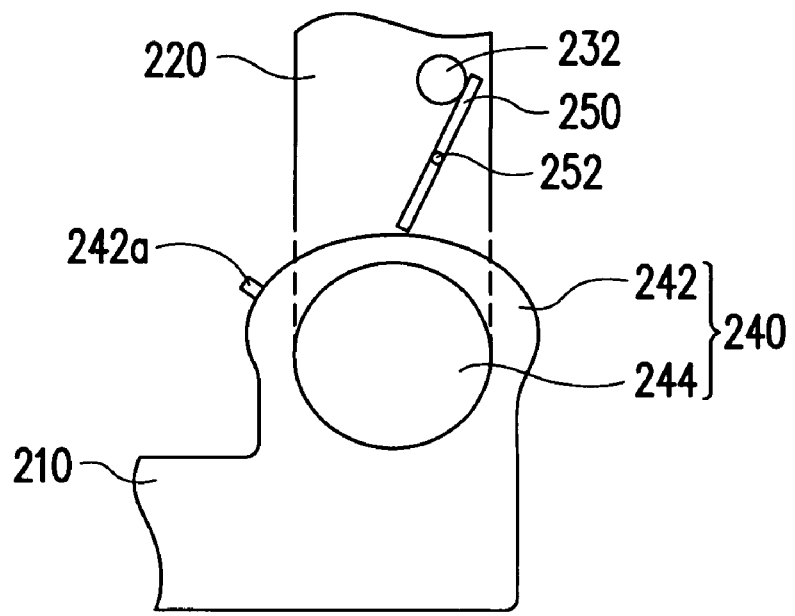
FIGS. 5A–5C are configurations showing progression of a movement of a light-guiding bar with a display sheathing according to an embodiment of the present invention.
Figure 5B:
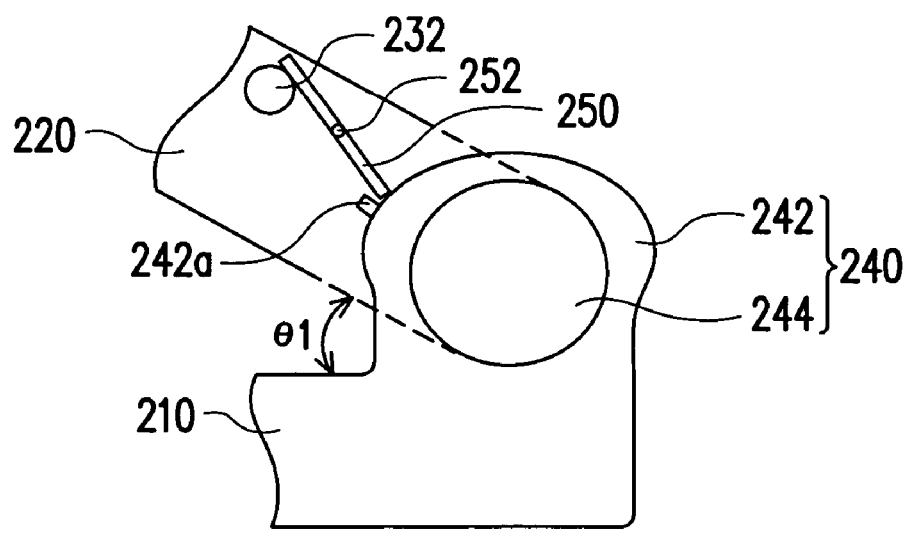
Figure 5C:
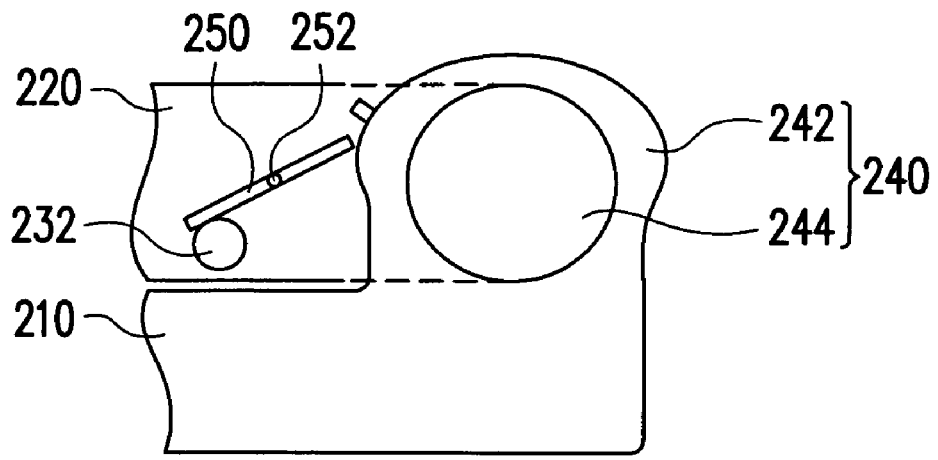

FIGS. 5A–5C are configurations showing progression of a movement of a light-guiding bar with a display sheathing according to an embodiment of the present invention. Referring to FIGS. 5A–5C, the light-guiding bar 232 moves with the display sheathing 220 through a spring-plate module. The movement is discussed herein. Referring to FIG. 5A, the display sheathing 220 is opened. The spring-plate module 250 and the light-guiding bar 232 are near the second light-guiding plate 234*b* as shown in FIG. 4. In FIG. 5A, the pivot 240 comprises a fixed sleeve 242 and a movable pivot 244. Wherein, the movable pivot 244 is connected with the display sheathing 220. The fixed sleeve 242 is connected with the main body 210. The fixed sleeve 242 comprises a protrusion part 242*a*. In addition, the light-guiding bar 232 is connected with an end of the spring-plate module 250. Another end of the spring-plate module 250 contacts with the protrusion part 242*a* of the fixed sleeve 242 while the display sheathing 220 opens and closes. The spring-plate module 250 comprises a rotation center 252, which enables the spring-plate module 250 to swing between the first light-guiding plate 234*a* and the second light-guiding plate 234*b* as shown in FIG. 4.

As shown in FIG. 5B, during the closing process, the angle between the display sheathing 220 and the main body 210 is reduced. When the angle between the display sheathing 220 and the main body 210 is θ1, one end of the spring-plate module 250 is blocked by the protrusion part 242*a* of the fixed sleeve 242. In this embodiment, θ1 can be 30° or other angles, such as 45° or 60°.

As shown in FIG. 5C, because one end of the spring-plate module 250 is blocked by the protrusion part 242*a* of the fixed sleeve 242, when the display sheathing keeps closing, the spring-plate module 250 swings near the first light-guiding plate 234*a* as shown in FIG. 4. Since the light-guiding bar 232 is connected with the spring-plate module 250, the light-guiding bar 232 also swings near the first light-guiding plate 234*a*.

In contrary, when the angle between the display sheathing 220 and the main body 210 is more than 30°, the spring-plate module 250 swings near the second light-guiding plate 234*b*. The light-guiding bar 232 also swings near the second light-guiding plate 234*b* along with the swing movement of the spring-plate module 250, as shown in FIG. 4.

Figure 6:
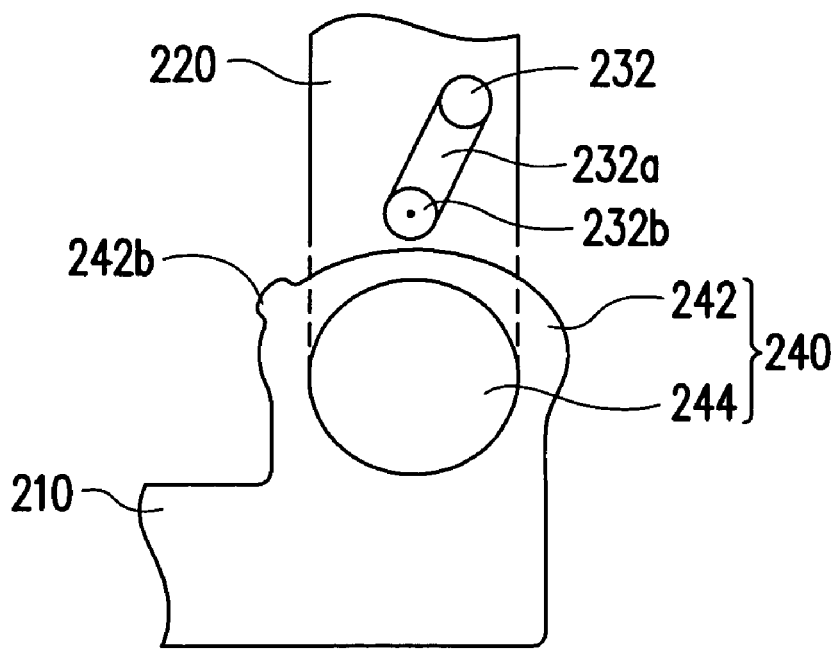
FIG. 6 is a schematic drawing showing a structure for a movement of a light-guiding bar with a display sheathing according to an embodiment of the present invention.

FIG. 6 is a schematic drawing showing a structure for a movement of a light-guiding bar with a display sheathing according to an embodiment of the present invention. Referring to FIG. 6, the light-guiding bar 232 can also move with the display sheathing 220 through a cam device in this embodiment. In detail, the light-guiding bar 232 in FIG. 6 comprises an extrusion part 232*a*. The end of the extrusion part 232*a* comprises a roller 232*b*. In addition, the fixed sleeve 242 comprises a cam shape 242*b*. During opening or closing the display sheathing 220, when the roller 232*b* passes the cam shape 242*b* on the fixed sleeve 242, the roller 232*b* rotates and promotes the light-guiding bar 232 to swing.

In an embodiment of the present invention, while the roller 232*b* passes the cam shape 242*b*, the light-guiding bar 232 swings from the first light-guiding plate 234*a* to the second light-guiding plate 234*b* as shown in FIG. 4, or from the second light-guiding plate 234*b* to the first light-guiding plate 234*a*. The movement of the light-guiding bar 232 and the display sheathing 220 by using the cam device is similar to that described in the last embodiment. Detailed descriptions are not repeated.

Figure 7:
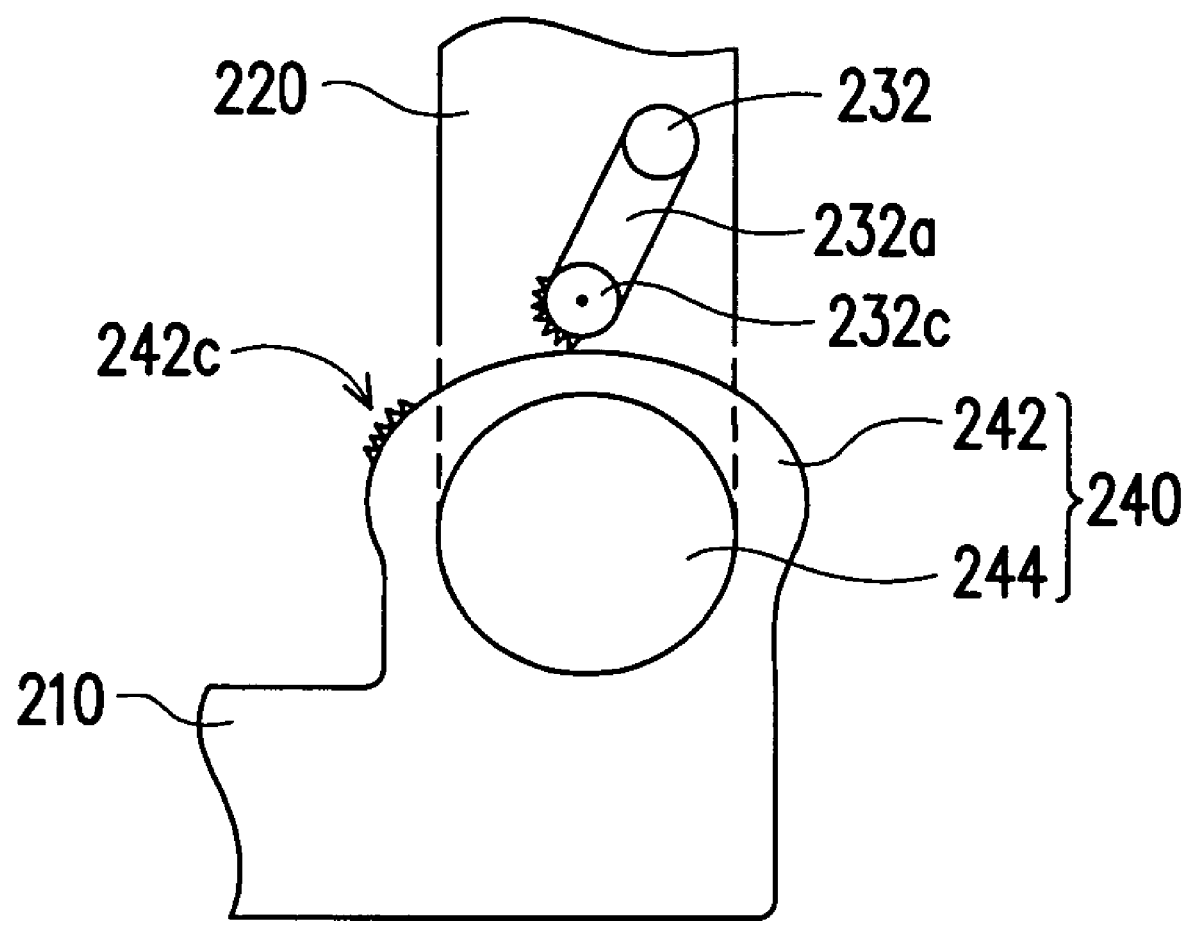
FIG. 7 is a schematic drawing showing a structure for a movement of a light-guiding bar with a display sheathing according to another embodiment of the present invention.

FIG. 7 is a schematic drawing showing a structure for a movement of a light-guiding bar with a display sheathing according to another embodiment of the present invention. Referring to FIG. 7, the light-guiding bar 232 can further move with the display sheathing 220 through a gear wheel in this embodiment. In detail, the light-guiding bar 232 in FIG. 7 comprises an extension part 232*a*. The end of the extension part 232*a* comprises a gear wheel 232*c*. In addition, the fixed sleeve 242 comprises a saw-type protrusion 242*c* operating in coordination with the gear wheel 232*c*. During opening or closing the display sheathing 220, when the gear wheel 232*c* passes the saw-type protrusion 242*c* of the fixed sleeve 242, the gear wheel 232*c* rotates and promotes the light-guiding bar 232 to swing.

In this embodiment, while the gear wheel 232*c* passes the saw-type protrusion part 242*c*, the light-guiding bar 232 swings from the first light-guiding plate 234*a* to the second light-guiding plate 234*b* as shown in FIG. 4, or from the second light-guiding plate 234*b* to the first light-guiding plate 234*a*. The movement of the light-guiding bar 232 with the display sheathing 220 by using the gear wheel 242*c* is similar to that described in the last embodiment. Detailed descriptions are not repeated.

Note that the spring-plate module, cam device, and the gear wheel apparatus are exemplary in the present invention. Other apparatus serving the same function may also be used in the present invention. Therefore, the present invention is not limited thereto. The movement of the light-guiding bar with the display sheathing can be performed by using not only the spring-plate module, extrusion-rolling apparatus, and the gear apparatus, but other apparatuses suitable for serving the same function.

Accordingly, the folding mobile phone of the present invention uses a double-sided liquid crystal display panel so that these two surfaces will alternatively display images when the display sheathing is opened or closed. Not only will the manufacturing costs be reduced, but these surfaces of the display sheathing have the same dimension, resolution and color saturation. In addition, the folding mobile phone of the present invention uses a pivot for connecting the main body and the display sheathing and for activating the light-guiding bar to swing between two light-guiding plates, and thereby serving the double-sided display function. Accordingly, the folding mobile phone of the present invention requires only one light source to perform the double-sided display function in the liquid crystal module. The manufacturing costs can thus be reduced. In addition, only one liquid crystal module is disposed in the display sheathing. The thickness of the display sheathing can also be reduced.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A folding mobile phone, comprising:
    a main body, comprising at least one button panel;
    a display sheathing pivoting on the main body, the display sheathing comprising a first surface near the main body, and a second surface corresponding thereto, the second surface being away from the main body, the display sheathing comprising:
        a liquid crystal module, a first light-guiding plate and a second light-guiding plate corresponding thereto being disposed on two surfaces of the liquid crystal module, the first surface exposing a portion of the first light-guiding plate, the second surface exposing a portion of the second light-guiding plate;
        a light source disposed at a side of the liquid crystal module; and
        a light-guiding bar disposed between the light source and the liquid crystal module, swinging between the first light-guiding plate and the second light-guiding plate to guide light from the light source to either the first light-guiding plate or the second light-guiding plate; and
    a pivot connecting the main body with the display sheathing, further connecting the light-guiding bar so that the light-guiding bar moves with the display sheathing and swings between the first light-guiding plate and the second light-guiding plate.

2. The folding mobile phone of claim 1, wherein when the display sheathing is opened, the light-guiding bar swings to the second light-guiding plate, and when the display sheathing is closed, the light-guiding bar swings to the first light-guiding plate.

3. The folding mobile phone of claim 1, wherein the light source comprises a light emitting diode.

4. The folding mobile phone of claim 1, wherein the light-guiding bar moves with the display sheathing through a spring-plate module.

5. The folding mobile phone of claim 4, wherein the pivot comprises a fixed sleeve and a movable pivot, the fixed sleeve being connected with the main body, the movable pivot being connected with the display sheathing, and the fixed sleeve has a protrusion part, and the spring-plate module comprises a first end, a second end and a rotation center, wherein the first end is connected with the light-guiding bar, the second end is adapted to contact with the protrusion part, and the rotation center is between the first end and the second end such that the light-guiding bar swings between the first light-guiding plate and the second light-guiding plate.

6. The folding mobile phone of claim 5, wherein the protrusion part is located at a position parallel to a line passing through a center of the movable pivot with a 30° angle from the button panel.

7. The folding mobile phone of claim 1, wherein the light-guiding bar moves with the display sheathing through a gear wheel apparatus.

8. The folding mobile phone of claim 7, wherein the pivot comprises a fixed sleeve and a movable pivot, the fixed sleeve being connected with the main body, the movable pivot being connected with the display sheathing, the fixed sleeve comprising a saw-type protrusion portion, the light-guiding bar comprising an extension portion, wherein an end of the extension portion comprises a gear wheel, adapted to contact with the saw-type protrusion portion, such that the light-guiding bar swings between the first light-guiding plate and the second light-guiding plate.

9. The folding mobile phone of claim 8, wherein a center of the saw-type protrusion portion is located at a position parallel to a line passing through a center of the movable pivot with a 30° angle from the button panel.

10. The folding mobile phone of claim 1, wherein the light-guiding bar moves with the display sheathing through a cam device.

11. The folding mobile phone of claim 10, wherein the pivot comprises a fixed sleeve and a movable pivot, the fixed sleeve being connected with the main body, the movable pivot being connected with the display sheathing, the fixed sleeve comprising a cam shape, the light-guiding bar comprising an extension portion, wherein an end of the extension portion comprises a roller, adapted to contact with the cam shape, such that the light-guiding bar swings between the first light-guiding plate and the second light-guiding plate.

12. The folding mobile phone of claim 11, wherein a longest distance from the cam shape to the center of the movable pivot is when the cam shape is located at a position parallel to a line passing through a center of the movable pivot with a 30° angle from the button panel.

13. A double-sided liquid crystal display apparatus, comprising:
    a liquid crystal module, a first light-guiding plate and a second light-guiding plate corresponding thereto being disposed over two surfaces of the liquid crystal module;
    a light source disposed at a side of the liquid crystal module; and
    a light-guiding bar disposed between the light source and the liquid crystal module, swinging between the first light-guiding plate and the second light-guiding plate to guide light from the light source to either the first light-guiding plate or the second light-guiding plate.

14. The double-sided liquid crystal display apparatus of claim 13, wherein the light source comprises a light emitting diode.

15. The double-sided liquid crystal display apparatus of claim 13, wherein the light source comprises a cold cathode fluorescent tube.

* * * * *